Dec. 30, 1947. M. H. JOHNSON ET AL 2,433,368
WAVE GUIDE CONSTRUCTION
Filed March 31, 1942 6 Sheets-Sheet 1

INVENTORS:
M.H. JOHNSON
W.H. RATLIFF JR.
BY W.W. HANSEN
ATTORNEY

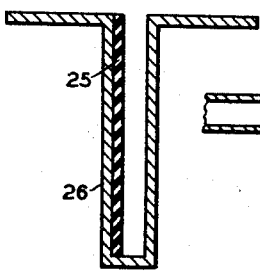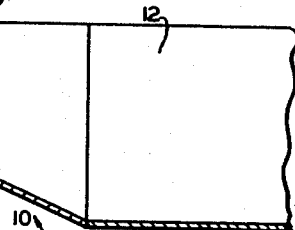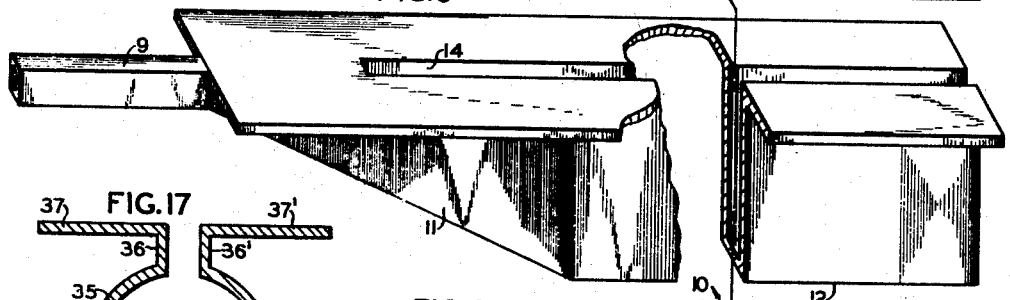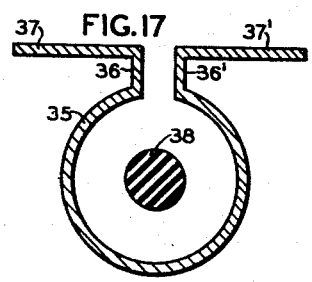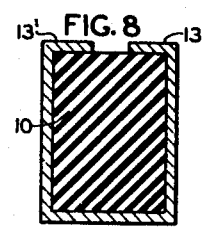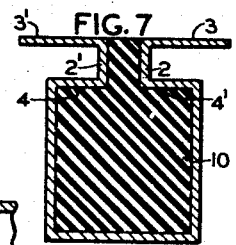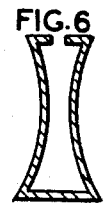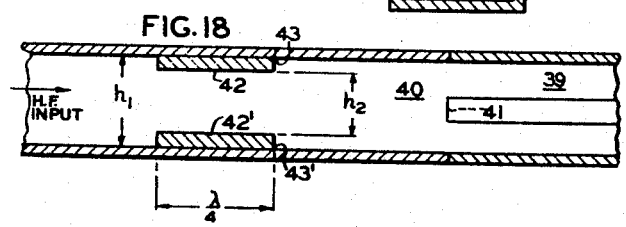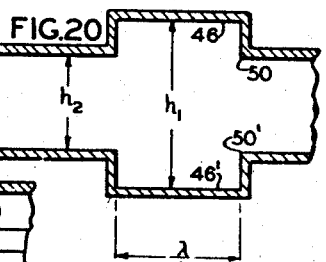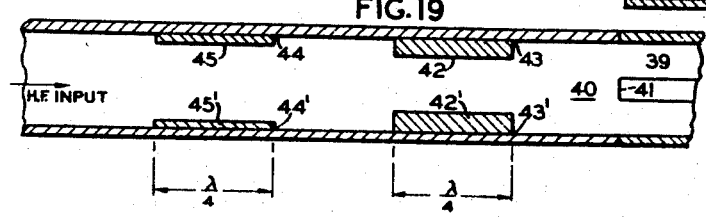

Dec. 30, 1947.   M. H. JOHNSON ET AL   2,433,368
WAVE GUIDE CONSTRUCTION
Filed March 31, 1942   6 Sheets-Sheet 3
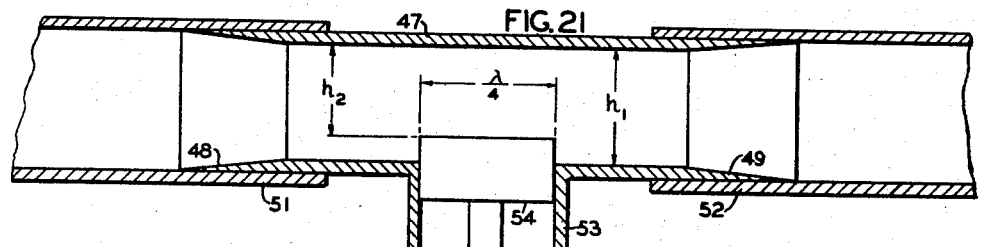
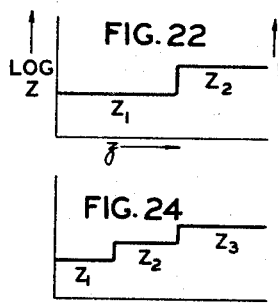
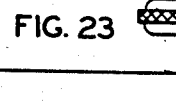
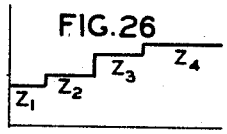
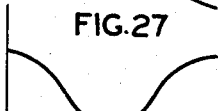
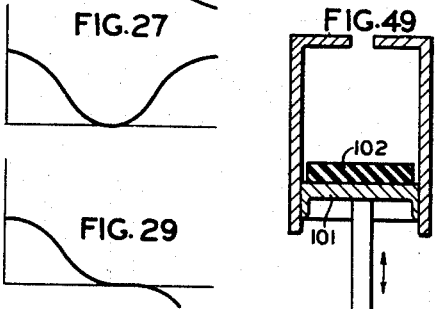
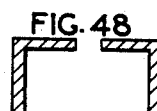
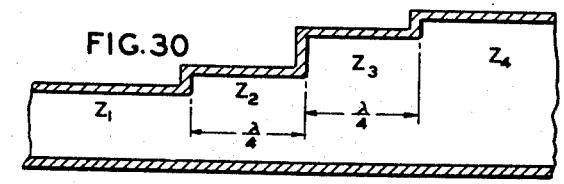
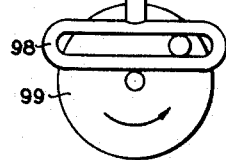
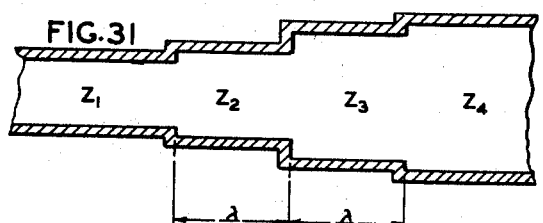
INVENTORS:
M. H. JOHNSON
W. H. RATLIFF JR.
BY W. W. HANSEN
Paul B. Hunter
ATTORNEY Dec. 30, 1947.    M. H. JOHNSON ET AL    2,433,368
WAVE GUIDE CONSTRUCTION
Filed March 31, 1942    6 Sheets-Sheet 4
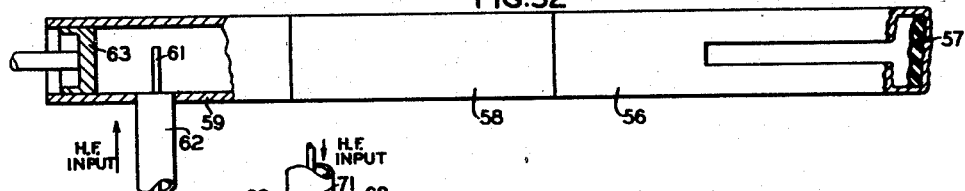
FIG.32
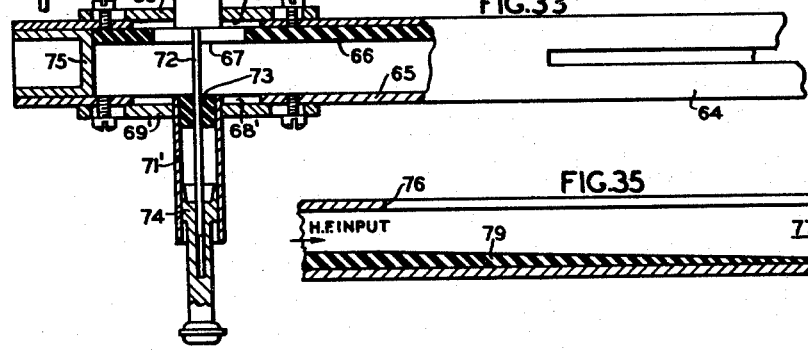
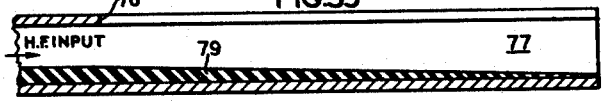
FIG.35
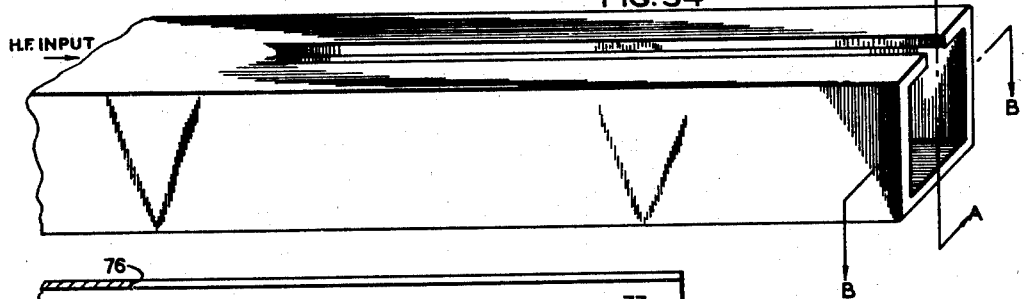
FIG.34
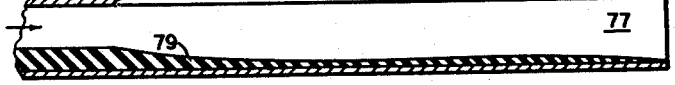
FIG.36
FIG.37
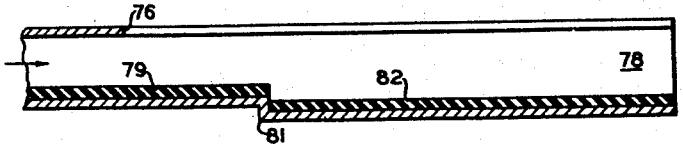
FIG.38
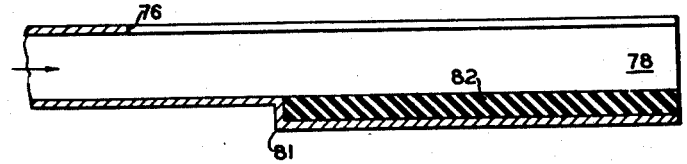
FIG.39
INVENTORS:
M.H. JOHNSON
W.H. RATLIFF, JR.
BY W.W. HANSEN
Paul B. Hunter
ATTORNEY Dec. 30, 1947.  M. H. JOHNSON ET AL  2,433,368
WAVE GUIDE CONSTRUCTION
Filed March 31, 1942  6 Sheets-Sheet 5

INVENTORS:
M. H. JOHNSON
W. H. RATLIFF Jr
BY W. W. HANSEN
Paul B. Hunter
ATTORNEY INVENTORS:
M. H. JOHNSON
W. H. RATLIFF, JR.
BY W. W. HANSEN
Paul B. Hunter
ATTORNEY Patented Dec. 30, 1947

2,433,368

UNITED STATES PATENT OFFICE 2,433,368

WAVE GUIDE CONSTRUCTION

Montgomery H. Johnson, Cambridge, Mass., and William H. Ratl'ff, Jr., Hempstead, and William W. Hansen, Garden City, N. Y., assignors to Sperry Gyroscope Company, Inc., Brooklyn, N. Y., a corporation of New York Application March 31, 1942, Serial No. 437,004

36 Claims. (Cl. 250—11)

This invention relates, generally, to ultra high frequency energy radiating devices, and, more particularly, to a novel type of ultra high frequency substantially end fire wave guide radiator.

Prior art ultra high frequency radiators are, in general, large in several dimensions. For instance, the directivity of an electromagnetic horn is dependent on the area of its mouth as well as the length of the horn. Likewise, parabolic radiators, for a given sharpness of the radiated beam, must be in diameter many times the wavelength of the radiation employed. When such radiators are used in conventional instrument landing systems for aircraft, their size, and the fact that they must be placed somewhat above the level of the ground, makes them hazardous obstacles. Also, the size and weight of such antenna means are undesirable for such uses as aircraft and other object detection and location, particularly, when the object locator is mounted in the aircraft itself. The provision of scanning means to operate with parabolic reflectors or with electromagnetic horns is a complex mechanical and electrical problem, as is well known to the art.

The principal object of the present invention is to provide a novel end fire radiating device whose directivity depends chiefly on the length of the device.

A further object lies in the provision of an end fire wave guide means capable of producing a well defined principal lobe of radiation, secondary lobes being negligible.

Another object of the present invention is to provide a radiating wave guide of the end fire type which is easily excited in the chosen mode while other modes are suppressed.

Yet another object of the invention is to provide an end fire wave guide radiator having a three-dimensional radiation pattern of desired shape the effective axis of which may correspond with that of the wave guide or may extend at an angle thereto.

A still further object is to control the effective radiation axis of the wave guide by simple mechanical or electrical means.

A divisional application Serial No. 495,101 in the name of William H. Ratliff, Jr., was filed July 17, 1943, covering the material of Figs. 46–49 and 55 of this application. A continuing application Serial No. 592,092 in the names of Montgomery H. Johnson and William W. Hansen was filed May 15, 1945, covering the material of Figs. 18–31 of this application.

A further object of the invention is to provide means for suppressing secondary lobes in the radiation patterns of end fire devices.

Yet another object is to provide means for excitation of end fire radiating devices.

Other objects and advantages will become apparent from the specification, taken in connection with the accompanying drawings, wherein the invention is embodied in concrete form.

In the drawings,

Fig. 6 is a transverse cross-section view of a radiating wave guide.

Figs. 7 and 8 are transverse cross-section views of radiating wave guides totally filled with dielectric.

Fig. 9 is a partially sectioned perspective view of a radiating wave guide, showing horn means of excitation.

Fig. 10 is a cross-section view taken along the lines 10—10 of Fig. 9.

Figs. 11 to 17 inclusive are transverse cross-section views of radiating wave guides partially filled with dielectric material.

Fig. 18 is a fragmentary longitudinal cross-section view of an impedance matching wave guide transformer attached to a radiating wave guide.

Fig. 19 is similar to Fig. 18.

Figs. 20 and 21 are longitudinal cross-section views of alternate forms of wave guide impedance matching transformers.

Figs. 22, 24, 26, and 28 are explanatory graphs of the logarithm of the characteristic impedance, log Z, as a function of the distance along the $z$ axis.

Figs. 23, 25, 27, and 29 are explanatory graphs of the reflection coefficient R as a function of frequency $f$.

Figs. 30 and 31 are longitudinal alternate forms of wave guide impedance matching transformers suitable for use with radiating wave guides.

Figs. 32 and 33 are fragmentary partial cross-section views of alternate means for exciting radiating wave guides.

Fig. 34 is a fragmentary perspective view of a radiating wave guide.

Figs. 35 to 43, inclusive, are fragmentary longitudinal cross-section views of partially dielectric filled radiating wave guides having means for modifying the shape of the resultant radiation pattern.

Figure 44:
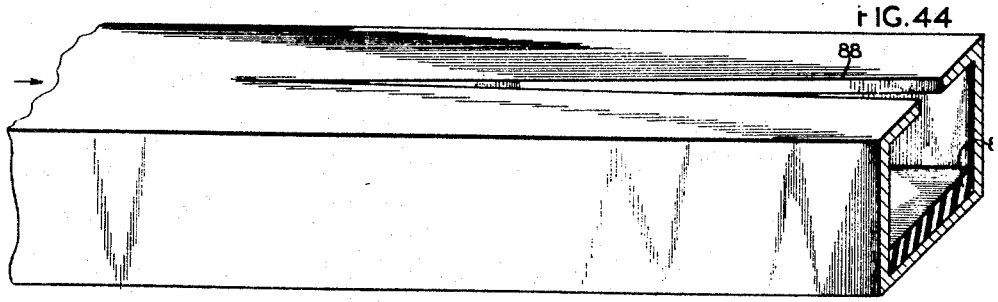
Figure 45:
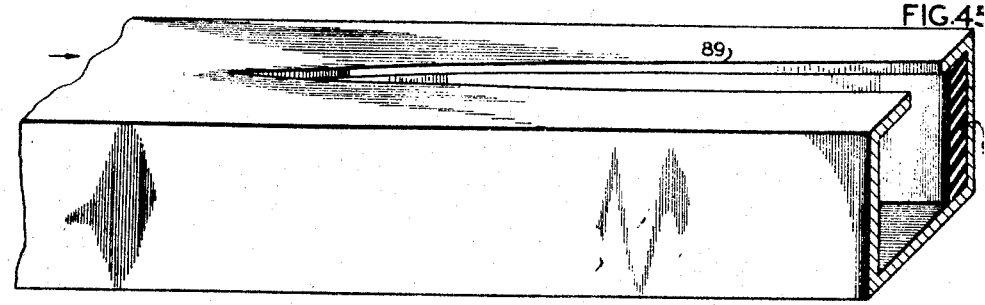

Figs. 44 and 45 are fragmentary perspective views of partially dielectric filled radiating wave guides provided with means for suppression of secondary lobes in the radiation pattern.

Figs. 46, 47, 48, and 49 are transverse cross-section views of radiating wave guides showing means for changing the angle of the principal lobe of the resultant radiation pattern.

Figure 50:
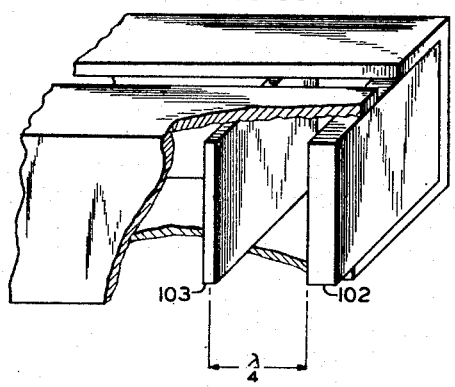

Fig. 50 is a fragmentary partially sectioned perspective view of an energy absorbing device suitable for use in a radiating wave guide.

Figure 51:
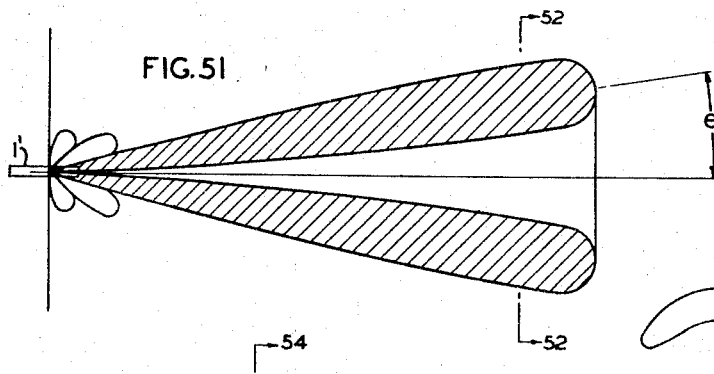

Fig. 51 is a graph showing one type of radiation pattern obtainable from a substantially end fire radiating wave guide.

Figure 52:
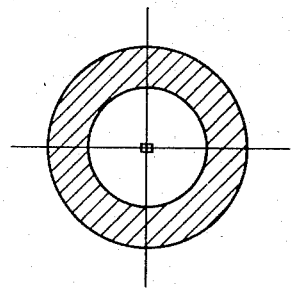

Fig. 52 is a cross-section taken along the line 52—52 of Fig. 51.

Figure 53:
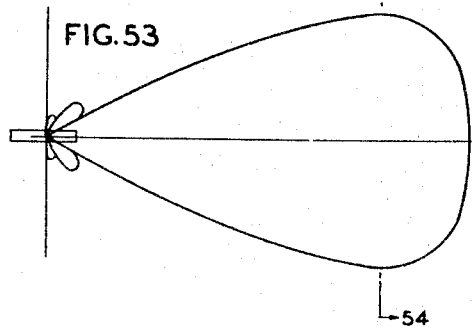

Fig. 53 is a graph showing a radiation pattern alternate to that of Fig. 51.

Figure 54:
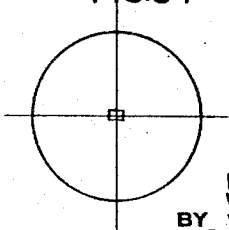

Fig. 54 is a cross-section taken along the line 54—54 of Fig. 53.

Figure 55:
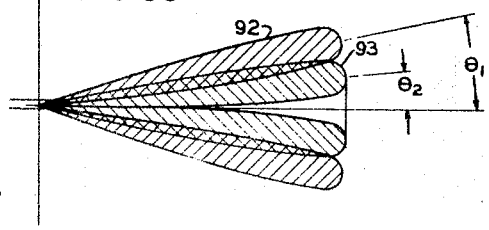

Fig. 55 is a graph showing the relative characteristics of radiation patterns produced when an end fire radiating wave guide is excited by two frequencies.

Figure 56:
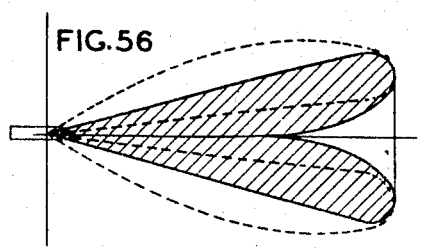

Fig. 56 is a graph showing the character of the radiation pattern when the phase velocity of the wave is altered during passage down the wave guide.

Figure 57:
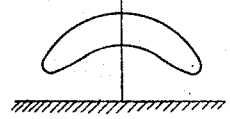

Fig. 57 is a graph similar to Fig. 52 when the slot surface of the end fire radiating wave guide is placed flush with a partially conducting ground surface, such as an aircraft landing field.

Similar characters of reference are used in all of the above figures to indicate corresponding parts.

Figure 1:
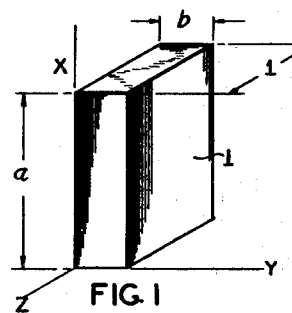
Fig. 1 is an explanatory schematic diagram of a wave guide for the purpose of establishing nomenclature.

Referring now to Fig. 1, there is shown a hollow rectangular wave guide $1$ oriented in a Cartesian coordinate system. The wave guide is bounded by conducting surfaces which enclose a volume having a depth $a$, a width $b$ and a length $l$ lying parallel to the $x$, $y$, and $z$ axes, respectively. The wave guide $1$ may be excited by a traveling wave of electromagnetic energy. The width $b$ is, however, made small enough to exclude modes of propagation with a large component of the electric field $E$ in the $x$ direction. In an air-filled guide this condition is satisfied when $b$ is less than one-half the free space wavelength of the exciting energy. Let $\lambda_0$ be this free space wavelength and $k_0$ or $$\frac{2\pi}{\lambda_0}$$

be the free space propagation constant. The corresponding wavelength and propagation constant for energy traveling along the $z$ axis within the wave guide may be defined as $\lambda$ and $k$ or $$\frac{2\pi}{\lambda}$$

respectively. The $z$ dependence of the electric field $E$ and the magnetic field $H$ for a wave traveling in the positive $z$ direction is $e^{i(kz-\omega t)}$, where $\omega$ is the circular or radian frequency of the exciting energy and $t$ is the time coordinate.

Figure 1A:
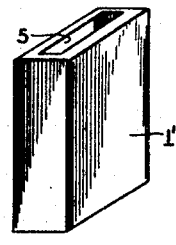
Fig. 1A illustrates the position on a wave guide of a radiating slot.

Fig. 1A shows a wave guide $1'$ similar to that of Fig. 1, but here a slot $5$ is cut along the length of the guide in the surface parallel to the $yz$ plane to allow radiation of the exciting energy. The radiation from all points of the slot $5$ produces constructive interference in a cone of revolution about the guide whose semiangle $\theta$ is given by:

$$\cos \theta = k/k_0 = \lambda_0/\lambda \qquad (1)$$

Fig. 51 illustrates that, in the radiation zone, the directional pattern in a plane containing such a guide has two principal energy lobes whose axes of symmetry make angles $\theta$ and $-\theta$, respectively, with the $z$ or longitudinal axis of the guide.

The propagation constant $k$ is determined by constructing electric and magnetic fields which satisfy Maxwell's equations at all points and which also satisfy the usual boundary conditions. The character of the slot and the resultant fringing of the field in the wave guide adjacent to the slot have a considerable effect which is difficult to calculate. The influence of the slot, however, is incorporated in the boundary conditions when the impedance looking from the wave guide into the slot is either very low or very high.

Figure 2:
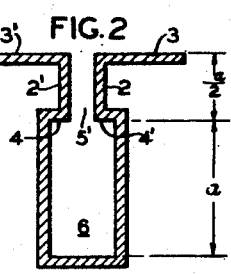
Fig. 2 is a transverse cross-section view of a low slot impedance radiating wave guide.
Figure 3:
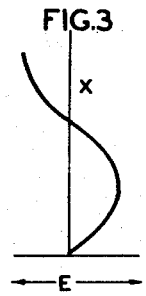
Fig. 3 is an explanatory graph showing electric intensity E as a function of distance along the $x$ axis.

Fig. 2 shows a hollow wave guide $6$ having a low impedance slot $5'$, i. e., the surface containing the slot is at a point of low impedance. The slot $5'$ is cut in the conducting surface $4$, $4'$ parallel to the $y$, $z$ plane and extended in depth by means of parallel conducting members $2$, $2'$, which are terminated by conducting flanges $3$, $3'$, placed at right angles to the slot. The depth of the slot is made approximately $a/2$ where $a$ is the depth of the guide. The $y$ and $z$ components of the electric field $E$ have a node at the plane defined by the conducting surface $4$, $4'$, as shown in the graph of Fig. 3.

Figure 4:
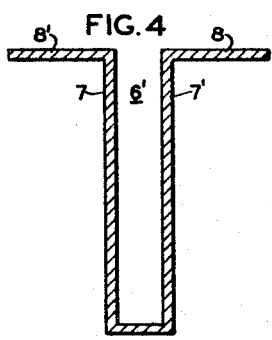
Fig. 4 is a transverse cross-section view of a high slot impedance radiating wave guide.
Figure 5:
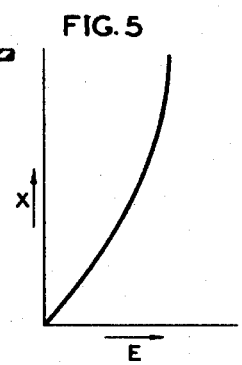
Fig. 5 is an explanatory graph of the same parameters as are shown in Fig. 3.

Fig. 4 shows a hollow wave guide $6'$ having a high impedance slot, i. e., the surface containing the slot is at a point of low impedance. The intruding surface containing the slot has been entirely removed. Sides $7$, $7'$ have conducting flanges $8$, $8'$ projecting oppositely therefrom and at right angles to these sides. The $y$ and $z$ components of the electric field $E$ have a loop at the surface of flanges $8$, $8'$, as shown in Fig. 5.

The electromagnetic field within the structure of Figs. 2 and 4, illustrating low and high impedance slots, respectively, is subject to broad mathematical analysis since the character of the slots may be neglected. For an air-filled wave guide of the low impedance slot type an electric field in the $y$ direction given by the equations:

$$E_y = \left(\sin \frac{\pi x}{a}\right) e^{ikz} \qquad (2)$$

$$k = k_0 \sqrt{1 - \left(\frac{\lambda_0}{2a}\right)^2} \qquad (3)$$

satisfy the boundary conditions. The associated magnetic field may always be derived from the electric field by the relation $$-\frac{i\omega H}{c} = \text{curl } E$$

The result of combining Equations 1 and 3 is:

$$\sin \theta = \frac{\lambda_0}{2a} \qquad (4)$$

For the wave guide to function as a substantially end fire array, $\theta$ must be very small, so that $a$ must therefore be rather large. For example, if $\theta$ is to be $\frac{1}{20}$ of a radian, or approximately 3°, $a$ is about ten wavelengths.

In the case of Fig. 4, wherein an air-filled guide with a high impedance slot is shown, an electric field in the $y$ direction given by the equations:

$$E_y = \left(\sin \frac{\pi x}{2a}\right) e_{iks} \qquad (5)$$

$$k = k_0 \sqrt{1 - \left(\frac{\lambda_0}{4a}\right)^2} \qquad (6)$$

satisfies the boundary conditions. For an angle of radiation of $\frac{1}{20}$ radian, $a$ must now be $5\lambda_0$, or one-half its previous value. The large depth $a$ required for an air-filled guide results in a somewhat unwieldy construction. In this respect, the high impedance slot guide of Fig. 4 is a definite improvement over the low impedance slot guide of Fig. 2.

It is found that considerable care is required in exciting air-filled guides such as those shown in Figs. 2 and 4, so as to not excite possible higher modes. The possible higher modes for the low impedance slot guide of Fig. 2 are given by the formula:

$$k_n = k_0 \sqrt{1 - (n\lambda_0/2a)^2} \text{ where } n=2, 3, 4 \ldots \qquad (7)$$

and for the high impedance slot guide of Fig. 4 are given by the formula:

$$k_n = k_0 \sqrt{1 - \left[\left(\frac{2n+1}{2}\right)\left(\frac{\lambda_0}{2a}\right)\right]^2} \qquad (8)$$

where $n=2, 3, 4 \ldots$ Because of these possible modes, it is seen that the high impedance slot guide of Fig. 4 is also preferable, as, for a given value of $\theta$, only half as many possible higher modes exist. If the desired value of $\theta$ is $\frac{1}{20}$ radian, it may be shown that 19 higher modes exist for the low impedance slot guide, but only 8 higher modes exist for the high impedance slot guide. In an air-filled guide of the high impedance slot type, these higher possible modes of excitation may be reduced in number somewhat by alteration of the sides 7, 7' of the wave guide in the manner shown in Fig. 6.

The preferred means of excitation of an air-filled radiating wave guide 12 of the type shown in Fig. 4 is by means of an electromagnetic horn-like device, as is shown in Fig. 9 and in cross-section in Fig. 10. A rectangular wave guide 9 feeds high frequency energy into an electromagnetic horn 11 of uniform width but of gradually increasing depth. The length of the horn section is chosen according to usual practice so that the radiating wave guide 12 fastened thereto is properly excited. The exciting wave guide 9, the horn 11, and the radiating wave guide 12 may be of equal width. The slot 14 of the radiating wave guide is made to extend back into the electromagnetic horn 11 as far as desired, so that the required mode for excitation of the guide may be set up early in the horn itself.

A wave guide of the radiating type may be entirely filled with dielectric material 10, as is shown in Figs. 7 and 8. Referring to Fig. 7, there is seen a dielectric filled radiator of the low slot impedance type. The conducting members of the guide are made similar to those of the guide in Fig. 2, the inner volume of the guide and the slot volume defined by walls 2, 2' being filled with dielectric material of any low loss type. For such a wave guide filled with material of dielectric constant $\epsilon$, an electric field given by:

$$E_y = (\sin \pi x/a) e^{iks} \qquad (9)$$

$$k = k_0 \sqrt{\epsilon - \left(\frac{\lambda_0}{2a}\right)^2} \qquad (10)$$

will satisfy the boundary conditions, and the corresponding angle $\theta$ of radiation is defined by:

$$\cos \theta = \sqrt{\epsilon - \left(\frac{\lambda_0}{2a}\right)^2} \qquad (11)$$

In Fig. 8, there is shown a dielectric-filled radiating wave guide of the high impedance slot type shown in Fig. 4. As is seen in Fig. 8, inwardly projecting flanges 13, 13' may serve in place of the outwardly projecting flanges 8, 8' of Fig. 4, the flanges 13, 13' of Fig. 8 thus serving as one wall of the wave guide and defining the slot width. An electric field defined by the equations:

$$E_y = (\sin \pi x/2a) e^{iks} \qquad (12)$$

$$k = k_0 \sqrt{\epsilon - \left(\frac{\lambda_0}{4a}\right)^2} \qquad (13)$$

will satisfy the boundary conditions, and the corresponding angle $\theta$ of the resultant principal radiation lobe is defined by:

$$\cos \theta = \sqrt{\epsilon - \left(\frac{\lambda_0}{4a}\right)^2} \qquad (14)$$

From Equations 11 and 14 it is seen that for an end fire radiator (if $\theta=0$), the depth $a$ for the low impedance slot case is defined by:

$$a = \frac{\lambda_0}{2\sqrt{\epsilon - 1}} \qquad (15)$$

and by:

$$a = \frac{\lambda_0}{4\sqrt{\epsilon - 1}} \qquad (16)$$

for the high impedance slot case. Thus, the depth of either dielectric-filled guide of the types shown in Figs. 7 and 8 for usual values of the dielectric constant $\epsilon$ is only a fraction of a wavelength, rather than on the order of 10 or 5 wavelengths, respectively, as is the case with air-filled guides. Furthermore, it is found that only one mode of propagation of the wave down the low impedance slot radiating guide is possible if $\epsilon > 4/3$, and likewise that only one mode is possible in the case of the high slot impedance guide if $\epsilon > 9/8$.

The air-filled end fire radiator is too bulky for many applications and may have too many possible modes of operation, whereas the completely dielectric-filled guide, though very small in dimensions, requires considerable accuracy in construction, as well as the use of a very homogeneous dielectric material. It may be found preferable to adapt a compromise structure preserving the desirable features of each type of guide by usage of a partially dielectric-filled wave guide radiator. If slabs of dielectric parallel to the $x, z$ face or the $y, z$ face are introduced in any position in the guide, as shown for instance in Figs. 11 and 13, it can be analytically shown that propagation of the wave down the guide can be made proper to give the required end fire radiation. It may also be empirically shown that a small amount of dielectric in a variety of shapes may be placed in various positions within such small dimensioned radiating wave guides to produce an end fire condition.

Figure 11:
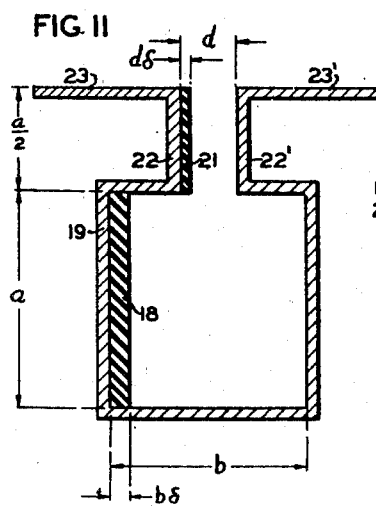

Referring to Fig. 11, there is seen in cross-section a radiating wave guide of the low impedance slot type discussed in connection with Fig. 2, its conducting portion consisting of metallic members disposed similarly to those of the guide of Fig. 2. A slab 18 of dielectric material of thickness $b \times \delta$ is shown placed against the inner side of conducting wall 19, the orientation of the dielectric being at right angles to that of the slot bearing surface 23, 23'. Here $\delta$ is the fraction of the volume of the guide filled with dielectric. A second slab of dielectric 21 of thickness $d\delta$ is shown placed parallel to slab 18 and against conducting wall 22 which acts as one of the walls of the low impedance slot. The width of the slot is $d$ and $\delta$ is the fraction as before. The wall 22 may preferably be made ½ the width of wave guide wall 19.

An electric field satisfying all boundary conditions for such a low slot impedance partially dielectric-filled wave guide has $x$ and $z$ components as well as a $y$ component. As these expressions are somewhat lengthy, only the equations which must be solved to determine $k$ are given. They may be shown to be:

$$\tan \frac{\pi b \delta}{\beta_1} = \frac{\epsilon \beta_1}{\beta} \tanh\left(\frac{\pi b(1-\delta)}{\beta}\right) \quad (17)$$

$$\frac{1}{\beta^2} + \frac{1}{\beta_1^2} = \frac{4(\epsilon-1)}{\lambda_0^2} \quad (18)$$

$$k = k_0 \sqrt{1 + \left(\frac{\lambda_0}{2\beta}\right)^2 - \left(\frac{\lambda_0}{2a}\right)^2} \quad (19)$$

Equation 19 may be solved with the help of Equations 17 and 18 and placed in the form:

$$k = k_0 \sqrt{\epsilon_{eff.} - \left(\frac{\lambda_0}{2a}\right)^2} \quad (20a)$$

where $\epsilon_{eff.}$ is defined as the effective dielectric constant of the wave guide. For small values of $\delta$, the value of the effective dielectric constant $\epsilon_{eff.}$ in such a low slot impedance type of radiating wave guide may be shown to be:

$$\epsilon_{eff.} = 1 + \frac{\delta(\epsilon-1)}{\epsilon - \delta(\epsilon-1)} \quad (21)$$

It is seen that the deviation of $\epsilon_{eff.}$ is linear with the fraction $\delta$, so that the adjustment of $\delta$ in obtaining the desired end fire operation of the guide is not critical.

Referring to Fig. 13, there is seen a dielectric-filled guide of the high slot impedance type of Fig. 4 with a slab 25 of dielectric placed parallel to the $z$, $x$ plane of the guide; i. e., placed parallel to conducting wall 26 of the guide.

An electric field satisfying all boundary conditions for such a high slot impedance partially dielectric-filled wave guide is similar to that for the low slot impedance case of Fig. 11. The propagation constant $k$ may be expressed in the form $$k = k_0 \sqrt{\epsilon_{eff.} - \left(\frac{\lambda_0}{4a}\right)^2} \quad (20b)$$

where the effective dielectric constant may be shown to be again expressed by Equation 21.

It is then seen that the deviation of $\epsilon_{eff.}$ from unity is linear with the slab thickness $b\delta$ in both cases. As a numerical example, if $\epsilon$ is 2.6 and $\delta = .1$, then $\epsilon_{eff.} = 1.066$ and $a$ is then $1.92\lambda_0$ for a low slot impedance guide of the type shown in Fig. 11 and $0.96\lambda_0$ for the high slot impedance guide shown in Fig. 13. For the case shown in Fig. 11, three higher modes of propagation of the wave in the guide may be shown to exist, and in the case shown in Fig. 13, only one other mode exists.

Figures 12, 16:
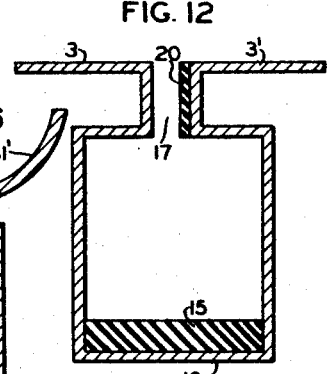

Referring to Fig. 12, a partially filled low impedance slot type of guide is shown whose conducting portions may again be similar to those discussed in connection with Fig. 2, wherein a conducting portion 16 of the guide opposite slot bearing surface 3, 3' has as on its inner face a slab 15 of dielectric of thickness $a\delta$, where $\delta$ is again the fraction of the volume of the guide filled with dielectric. In the slot 17 of the guide is placed a slab of dielectric 20 of thickness such as to give the same effective dielectric constant in the slot as in the guide. The following electric field and its associated magnetic field satisfy all boundary conditions on the metallic surfaces and on the dielectric interface for this guide. In air:

$$E_y = \sin \pi\left(\frac{x-a}{\alpha}\right) e^{ikz} \quad (22)$$

and in the dielectric:

$$E_y = C\left(\sin \frac{\pi x}{\alpha_1}\right) e^{ikz} \quad (23)$$

where $\alpha$, $\alpha_1$, and the propagation constant $k$ may be shown to be determined by the following equations, these equations being imposed by the boundary conditions at the dielectric interface and by the wave equations:

$$\left(\frac{1}{\alpha_1}\right)^2 - \left(\frac{1}{\alpha}\right)^2 = \frac{4}{\lambda_0^2}(\epsilon-1) \quad (24)$$

$$\tan \frac{\pi a}{\alpha}(\delta-1) = \tan \frac{\pi a \delta}{\alpha_1} \quad (25)$$

$$k = k_0 \sqrt{1 + \left(\frac{\lambda_0}{2\alpha}\right)^2} \quad (26)$$

Equation 26 may be solved with the help of Equations 24 and 25 and placed in the form of Equation 20a. When $\delta$ is chosen small in order to avoid making dimensions critical, the low slot impedance guide of Fig. 12 may be shown to have the following effective dielectric constant:

$$\epsilon_{eff.} = 1 + \frac{2}{3}\pi^2 \delta^3(\epsilon-1) \quad (27)$$

Dielectric material may also be placed in the bottom of a high slot impedance guide such as that of Fig. 4, and it may also be shown that for small values of $\delta$ the effective dielectric constant of such a guide is determined by the equation:

$$\epsilon_{eff.} = 1 + \frac{1}{12}\pi^2 \delta^3(\epsilon-1) \quad (28)$$

when $k$ is expressed in the form of Equation 20b.

It may be experimentally shown that slabs of dielectric of thickness $a\delta$ may be placed in many positions parallel to the position of slab 15 in Fig. 12 in such guides as those of Figs. 4 and 11, to produce the required end fire radiation effect.

It is seen from Equations 27 and 28 that the deviation of $\epsilon_{eff.}$ from unity depends directly on the cube of the dielectric thickness, and, as the adjustment of the proper end fire condition is seen to depend directly upon $\epsilon_{eff.}$, a guide with the dielectric so placed may be somewhat critical in adjustment for the desired end fire condition, and that therefore the configuration shown in Fig. 11 or Fig. 13 is to be preferred to that of Fig. 12.

Figure 14:
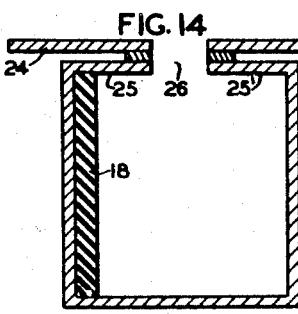
Figure 15:
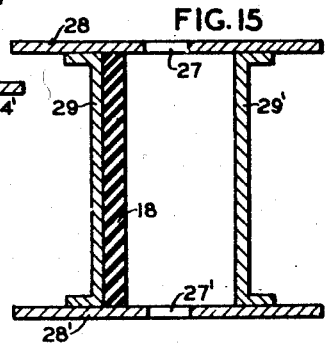

Figs. 14 and 15 show in cross-section modified radiating wave guides of the aforementioned preferred type by way of illustration of the fact that the present invention may be adapted to many forms of guide. Fig. 14 is of the high slot impedance type, the conducting members 24, 24' defining the slot being folded back on the walls 25, 25'. Fig. 15 shows a guide with oppositely placed slots 27, 27' defined by walls 28, 28' which project past the guide. The wave guide is further included in cooperating walls defined by conducting channels 29, 29'. On either or both walls, or adjacent to either or both walls may be placed dielectric slab 18 in a manner previously discussed.

Fig. 16 illustrates the fact that the conducting members 3, 3' of a guide such as that shown in Fig. 12 may be modified to have parabolic cross-section. Half parabolic members 31, 31' cooperate with high impedance slot 32, the guide having dielectric disposed as at 33 or 34, or as shown in Fig. 11. This modification increases the radiation in the plane containing the radiator and may be applied to the corresponding conductors of any other type of radiating guide.

Fig. 17 further illustrates that the present invention may be applied to any form of wave guide 10 which may be suitably excited. As shown, the guide consists of tubular conductor 35, cooperating with conducting walls 36, 36', which are terminated in conducting portions 37, 37' fixed at right angles thereto. The wave guide 35 may be air-filled, or completely or partially dielectric-filled. As illustrated, a portion of the volume of the guide is occupied by dielectric rod 38 concentrically placed therein. Rod 38 need not be concentrically placed, and may be of any suitable form which complies with the required end fire radiating conditions. It is seen that these conditions may be met in a variety of ways, and that the forms shown in the drawings are merely intended to be illustrative.

The parallel conducting members 2, 2' of Fig. 2 (or the corresponding members of Figs. 7, 11, 12, 14, 15, 16 or 17) and the flanges 3, 3' (or the corresponding members of Figs. 4, 7, 9, 11, 12, 13, 14, 15 or 16) determine the character of the fringing of the field just exterior to the slot, and thus determine the manner in which the field within the guide is coupled to and exchanges energy with the space outside the guide. Such conducting members or flanges in cooperation with the slot thus provide coupling means between the interior and exterior of the guide. However, it is to be understood that where the improvement offered by the conducting members and/or flanges is not required, the slot itself can constitute such coupling means.

Such radiating wave guides in general require impedance matching means to match them to wave guides through which the input energy flows. Such devices are shown in Figs. 18, 19, 20, 21, 30, and 31. There is seen in Fig. 18 a radiating wave guide 39 in cross-section whose radiating slot begins at the point 41 and which is attached to a wave guide 40 whose cross-section is equal to that of the radiating guide. Preferably equal height conducting plugs 42, 42' are attached to opposite surfaces of the wave guide 40 perpendicular to the side containing the slot. The distance between these wave guide surfaces is $h_1$ while the distance between the opposed faces of the plugs 42 and 42' is $h_2$. The length of the plugs 42, 42' is approximately a quarter wavelength or odd multiple thereof as measured in the guide 40 at the operating frequency. The proper position of the plugs 42, 42' along the z or longitudinal axis may be determined by measuring the standing wave ratio $$\frac{V_{max}}{V_{min}}$$

in the guide 40 as a function of distance along this guide. Here $$\frac{V_{max}}{V_{min}}$$

is the ratio of the magnitudes of the voltage loops to the voltage nodes in the guide before the plugs are in place. The plugs are then inserted and fastened so that one edge of the plugs, at 43, 43', is at a voltage nodal point for the standing wave found in the guide. The dimensions of the plugs are determined by the standing wave ratio $$\frac{V_{max}}{V_{min}}$$

and the width $h_1$ of the guide, as expressed by the relation:

$$\frac{V_{max}}{V_{min}} = \frac{h_1}{h_2} \qquad (29)$$

The point 43 is preferably the first minimum in the standing wave found in the non-radiating guide adjacent to the slot ending 41. A single plug 42 may be used if the standing wave ratio is nearly unity, as the wave traveling through the guide is less distorted by a small unsymmetrical disturbance than by a large one.

If one such trial at reduction of the standing waves due to impedance mismatch is insufficient, the procedure may be repeated as shown in Fig. 19, a new nodal point 44, 44' being found to determine the position of smaller plugs 45, 45', the plugs 45, 45' also being approximately a quarter wave long in the guide.

The matching sections need not be reentrant, as in Figs. 18 and 19, but may enlarge the guide in one or two oppositely spaced enlargements, as at 46, 46' in Fig. 20. If the larger dimension is still defined as $h_1$, it will here refer to the width of the enlarged portion 46, 46' while the smaller distance $h_2$ will refer to the width of the guide itself. With these definitions the size of the enlarged portion 46, 46' is again determined by Equation 29. The edges 50, 50' are placed at the voltage loop nearest the slot, each enlargement being approximately a quarter wave long in the guide. This type of transformer may be preferred to the reentrant type, as it avoids high electric fields and lessens the likelihood of arc overs at high power levels.

The devices of Figs. 18 and 20 may be made adjustable in the manner shown in Fig. 21. A slideable guide 47 with ends tapered over a distance large relative to one-half wavelength in the guide, as at 48, 49, is mounted to slide in the end of the excited wave guide 51 and a non-radiating guide 52 feeding directly into the radiating guide or other device. Projecting at right angles to guide 47 and mounted thereon is a tube 53 in which a conducting rectangular piston 54 may be positioned by means of knob 55. Piston 54 is a quarter wavelength as measured in the guide in the direction of energy flow, and is substantially as deep as guide 47. Procedure in adjusting the transformer may be similar to that for adjusting the transformers of Fig. 18.

The impedance matching transformers so far described may be found to be somewhat critical with respect to frequency variations of the high frequency utilized. It may be desirable to provide such devices having broader pass bands for use with apparatus in which perfect frequency stabilization is not obtainable. Consider a joint between wave guides of impedances $z_1$ and $z_2$. If the impedance discontinuity is made abruptly by joining the two wave guides directly together, as is shown in the graph of Fig. 22, the reflection coefficient R characteristic of the joint is a constant as a function of frequency, as is shown in the graph of Fig. 23. The reflection coefficient is defined as the ratio of the amplitudes of the reflected to the downgoing waves in the guide. It is found that if the discontinuity in impedance between two such pipes is spread over two joints, each discontinuity being spaced a quarter wavelength apart, in such a manner that the increments in the logarithm of the characteristic impedances for each section of pipe are equal, that the reflection coefficient characteristic of such a joint means may have the frequency characteristic shown in the graph of Fig. 25, crossing the $R=0$ axis at one definite point.

It is found that if three discontinuities each a quarter wave apart are provided to join two such pipes, and that if the discontinuities in the logarithm of the characteristic impedances of the wave guide sections at each pipe joint are defined by the relations:

$$\left.\begin{array}{l} \log z_2 - \log z_1 = k_1 \\ \log z_3 - \log z_2 = 2k_1 \\ \log z_4 - \log z_3 = k_1 \end{array}\right\} \quad (30)$$

where $k_1$ is a constant, as shown in the graph of Fig. 26, then the reflection coefficient R as a function of frequency is of the form shown in Fig. 27. If four discontinuities in the logarithm of the impedances are defined by three one quarter wave sections joining the two terminal impedances, as in the graph of Fig. 28, the reflection coefficient is of the form of the graph of Fig. 29, if the increments in the logarithms of successive sections are described by the relations:

$$\left.\begin{array}{l} \log z_2 - \log z_1 = k_2 \\ \log z_3 - \log z_2 = 3k_2 \\ \log z_4 - \log z_3 = 3k_2 \\ \log z_5 - \log z_4 = k_2 \end{array}\right\} \quad (31)$$

It is seen that a transformer having a reflection coefficient of the form of Fig. 27 has a useful frequency range, and that a transformer with a reflection coefficient similar to Fig. 29 has an even broader pass band. In fact, it is found that if the coefficients of $(x+1)^n$ are used to describe the increments in the logarithm of sucessive quarter wavelength sections making up an impedance matching transformer between two wave guides, then, as $n$ is increased, the useful frequency range of such a guide is increased.

Figs. 30 and 31 illustrate in cross-section rectangular wave guides in which the relations of Equation 30 are utilized. The guide may be of any cross-section and the geometrical alterations in the guide used may be applied to the guide in any manner, although they are preferably applied in a manner which does not alter the phase velocity of the wave traveling through the transformer. The term phase velocity is to be understood as the ratio of the circular frequency of the exciting wave to the propagation constant of the guide. In general, in the cases shown in Figs. 18 to 21, 30 and 31, if the guide is rectangular, the alterations are made in sides of the guide perpendicular to electric field therein, so that there is no change in the phase velocity of the wave in the transformer. In this case, the ratios of the characteristic impedances of any two sections is equal to the ratio of the dimensions parallel to the electric field of the two sections.

Such wave guide transformers may be interposed between wave guide radiators and the excitation means for driving the combination, as is shown in Fig. 32. A radiating wave guide 56, which may contain dielectric material, as at 57, is shown directly attached to an impedance matching transformer 58, which may be any of the types illustrated in Figs. 18 to 21, 30 and 31 or of any other type. Feeding transformer 58 is wave guide portion 59, which may be excited in the desired mode by quarter wave antenna 61 projecting therein and fed from coaxial line 62. Closing wave guide portion 59 is conducting plug 63, which may be positioned to be exactly a quarter wave from antenna 61. Other well known exciting means may replace the entire wave guide portion 59 or the quarter wave antenna 61, as desired.

Referring to Fig. 33, there is shown in partial cross-section a radiating wave guide 64 fed directly by exciting wave guide 65. Radiator 64 is shown containing dielectric material, as at 66, and may be of the type shown in Figs. 11, 14, 15, or others. Dielectric slab 66 is seen to extend from radiating portion 64 entirely through exciting portion 65. Slot 67 is provided in the dielectric and slots 68, 68' are provided in the conducting side walls of the guide. Slidably mounted over slots 68, 68' are plates 69, 69' bearing outer concentric line conductors 71, 71' so that their position in the plane of the drawing may be simultaneously adjusted as desired. Tubular conductors 71, 71' support inner conductor 72 by means of dielectric plugs, as at 73, conductor 72 extending out of tube 71 across wave guide 65, and through conductor 71'. Conductor 71' is closed by adjustable conducting plug 74 which acts to match the concentric line to the guide. End plug 75 closes the end of guide 65. By adjustment of the position of conductor 72, the distance between conductor 72 and plug 75 may be made exactly a quarter wavelength, the wavelength corresponding to the effective wavelength of the energy exciting the guide, due to the presence of dielectric 66. It is readily seen that a variety of excitation methods may be used to feed a radiator of the type shown in Fig. 33, or any other useful type of wave guide radiator.

Fig. 34 represents, in perspective, a rectangular wave guide of the high slot impedance type shown in cross-section in Fig. 4 for use in discussing Figs. 35 to 45, inclusive. It is to be understood that high or low slot impedance wave guide types of any desirable cross-section may replace this type of guide, and may be used to produce results similar to the results discussed in any of the Figs. 35 to 45. In general, it is seen that any of the guides previously discussed may be used to produce a radiation pattern shown in azimuth (or elevation) in Fig. 53 and in cross-section in Fig. 54 when the exact end fire conditions are imposed. When the exact end fire conditions are not quite met with, the resultant radiation pattern may be similar in azimuth (or elevation) to that shown in Fig. 51 and in cross-section in Fig. 52. The pattern for conditions slightly off the end fire condition is seen from Figs. 51 and 52 to be an envelope of roughly conical exterior, with a reentrant roughly conical region in which substantially no energy is projected. The character of the curves defining these roughly conical portions may be altered to either of the shapes shown in full and dotted lines in Fig. 56 or to many other similar desired shapes, by any of the means shown in Figs. 35 to 41.

Referring now to Figs. 35 and 36, there is seen in cross-section a radiating wave guide 77 of the form shown in Fig. 34, the section corresponding to that taken along the line A—A of Fig. 34. Placed parallel to the face of the guide 77 containing the radiating slot, which begins at point 76, is a slab of dielectric material 79, which begins a gradual taper opposite point 76, and which may be tapered from there on linearly as in Fig. 35, exponentially as in Fig. 36, or in any manner which will produce a desired radiation pattern.

As in Fig. 37, the dielectric material 79 may bring about a similar pattern if it is caused to run from a region of low electric field, such as at 80, into, or across regions of higher electric field, substantially as shown.

A similar result is produced in the case of Fig. 38, wherein a guide 78 is caused to have an abrupt change in its cross-section, as the enlargement at point 81. Dielectric 79 may be ended at point 81, and a dielectric portion 82 of equal, different, or varying thickness may extend along the remaining enlarged (or diminished) portion of the guide. If desired, the dielectric portion 79 may be eliminated, as shown in Fig. 39, and the remaining enlarged portion of the guide 78 may have a dielectric material of uniform or varying thickness, as desired.

Figure 40:
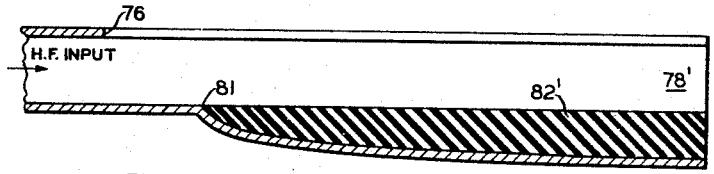
Figure 41:

Fig. 40 illustrates a radiating guide 78', whose cross-section varies in a tapered manner, being enlarged beyond the point 81, and containing a tapering slab of dielectric 82' which may vary in any chosen manner. As seen in Fig. 41, a regular cross-section guide 77 may contain a tapered piece of dielectric 83 placed in or near the region of maximum electric field, if desired. It is to be understood that the dielectric slab may be placed in all of these cases at right angles to the face of the guide containing the radiating slot.

Figure 42:
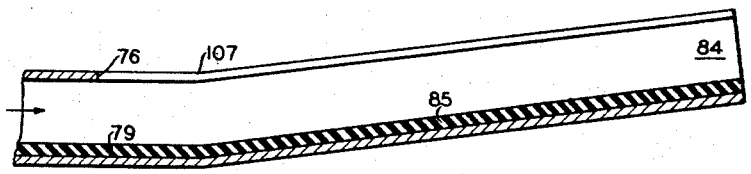
Figure 43:
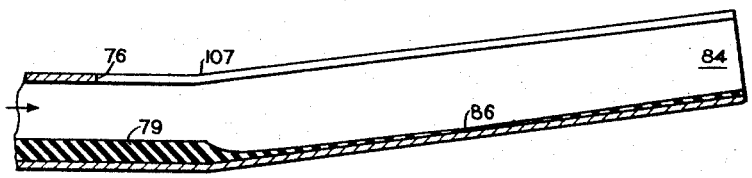

The relative position of the maximum lobe of radiation and secondary lobes, and their relative intensities, may be altered in any desired manner by changing the relative phase of the radiated energy along different portions of the guide. A means for such effective phase change is shown in Figs. 42 and 43. A radiating wave guide 84 of any of the types previously shown may have a slight upward (or downward) bend, as at 107. The effect is to move the guide closer to any distant arbitrarily chosen point, thereby effectively altering the relative phase of the radiation emitted from the slot as seen from said distant point. Such a procedure is found to also modify the shape of the maximum lobe of radiation from the almost end fire condition, as shown in Fig. 56. A continuous portion 85 of dielectric may be placed in the guide in any of the manners previously disclosed, as shown in Fig. 42, or a tapered portion of dielectric 86 may be used as in Fig. 43, or dielectric may be placed in any of the configurations previously disclosed.

It may be shown that the interference pattern from a line source of uniform strength contains, in addition to the primary radiation pattern previously discussed, several secondary energy lobes, as is seen in Figs. 51 and 53. If $\theta$ is the angle for which all points on the slot interfere constructively and $\theta + \Delta\theta$ is the angle of the first minimum in the diffraction pattern, then $$\lambda_0 = l \cos \theta - l \cos (\theta + \Delta\theta) \quad (32)$$

For the end fire antenna, however, $\theta$ is small, and if $\theta = 0$ Equation 12 becomes:

$$\Delta\theta = \sqrt{\frac{2\lambda_0}{l}} \quad (33)$$

The next minimum occurs at $\sqrt{2}\,\Delta\theta$, the third at $\sqrt{3}\,\Delta\theta$, etc. With $l = 200\,\lambda_0$ the first minimum is at 5.7°, the second at 8.1° and the third at 9.9°. These results are actually valid for a line source of uniform strength only. The minimum positions as well as the intensity in the secondary maxima can be radically changed by altering the source distribution which in turn is determined by the size and shape of the radiating slot. Figs. 44 and 45 illustrate wave guides which produce such radiation patterns.

In Fig. 44 a high slot impedance guide of the type shown in cross-section in Fig. 14, with a sheet of dielectric material 87 placed opposite to the radiating slot, is shown with a linearly tapered slot 88. The radiating slot may be exponentially or otherwise tapered, and may be placed in a guide in which the dielectric is at right angles to the surface containing the slot, as is illustrated by a slot 89 and dielectric 91 in Fig. 45. It is further evident that such slots may be of high or low impedance, as previously described, and may be placed in any shape of radiating guide in which the placement of the dielectric follows the rules imposed in the previous discussion, as desired.

As seen from Equation 33 the angle $\theta$ is a function of the exciting wavelength $\lambda_0$ in the guide. Thus two sources of ultra high frequency of slightly different frequency may be used to excite such a guide near the complete end fire condition to obtain two concentric lobes similar to that of Fig. 51, as shown in Fig. 55, the lobe 92 being characterized by angle $\theta_1$ and frequency $f_1$, and lobe 93 by $\theta_2$ and $f_2$. Similarly, it is seen that any type of frequency modulation applied to the exciting oscillator may be utilized to cause the beam to scan between the positions of lobes 92 and 93 as limits in any practicable manner as a function of frequency. Such a system provides a ready means of obtaining a beam which will scan over a predetermined space volume or of two stationary beams which may be utilized by conventional blind landing systems. If the energy feeding the radiator is of a frequency such that the exact end fire pattern shown in Fig. 53 is produced, and is then caused to be frequency modulated, pulses of energy will result, the guide cutting off radiation entirely at times, and then emitting a lobe of the form shown in Fig. 53 at other times. The character and duration of the pulses may be varied in any manner well known to the art.

The phase velocity of the wave traveling down the guide may be altered by any other mechanism, such as those illustrated in Figs. 46 to 49, inclusive, in which means are shown for varying the physical geometry of the guide as a function of any desired time function. Referring to Fig. 46, there is seen a partially dielectric-filled guide of the low slot impedance type. Running through the length of the guide is a rotatable rectangular rod 94 of dielectric (or conducting) material, which may be uniformly or otherwise rotated, or which may be merely positioned in a manner to adjust the radiator to the exact end fire condition.

Distortion in any manner of the geometry of the guide, such as rotation of the semi-circular rod of dielectric (or of metal) 95 in a guide such as that of Fig. 47 will produce the same result, as will also the movement of a slab of dielectric (or of metal) of any chosen shape such as the rectangular piece of dielectric 96 shown in Fig. 48. Dielectric 96 extends throughout the length of the guide, and may be moved by means of any well known mechanism such as by rod 97 attached to Scotch yoke 98 actuated by wheel 99. Similar results may be produced by movement of any of the walls of the guide, preferably as shown in Fig. 49 by motion of the entire length of wall opposite to the slot bearing surface. Here conducting wall 101, carrying dielectric 102 is shown actuated as a piston. It is to be understood that the means illustrated in Figs. 46 to 49, inclusive, may be applied equally well to any of the types of radiating guides previously discussed.

It may be desirable, if the radiating wave guide is short enough so that considerable energy has not yet been radiated by the time the wave reaches the far end of the guide, to provide absorbing means there, as shown in Fig. 50, to dispose of this unused energy. In Fig. 50, the far end of a rectangular guide is shown closed by a conducting plug 102, and placed parallel to and one-quarter wavelength away from plug 102 is a preferably thin partially conducting wall 103 of optimum resistance, so that unused energy is largely absorbed on its first passage through partial conductor 103, is reflected by end wall 102, and by combined action of the partial conductor 103 and interference with the downgoing wave, is entirely dissipated.

Any of the previously described wave guide radiators may be placed in the ground or in other conducting medium of large extent, with the slot bearing surface of the guide parallel to and flush with that conducting medium. With the slot thus parallel to the ground, the electric field which is parallel to the ground must necessarily vanish at the surface of the ground. A node in the radiation pattern therefore appears at $\theta=0$. The precise way in which the intensity rises from this zero value to that given by the source when no ground or other conducting plane is present varies greatly with the particular modification of the guide used, but, in general, it is of a cross-sectional form shown in Fig. 57. It is evident that two such beams may be simultaneously projected, one above the other, or that such a beam may be scanned through an angle $\Delta\theta$ depending upon the usage of frequency modulation of the carrier or of use of such devices as described in Figs. 46 to 49, inclusive. As shown in Fig. 16, parabolic members may be used with such radiators to make the resultant beam, when the guide is buried in a conducting medium, even more directive than that shown in Fig. 57.

This discussion has been limited to the case in which the wave guide radiator is spoken of as an energy transmitting device, but it is to be understood that it is equally useful as a receiving antenna, its characteristics in such a case being exactly analogous to those pertaining to transmission.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A substantially end fire directive radiator comprising a conducting wave guide adapted to be excited by electromagnetic waves, said guide having a length great compared to its transverse dimensions, said guide being longitudinally apertured over a distance great compared to a wavelength of said exciting waves for radiating the same, means for producing a propagation constant for the high frequency energy within said wave guide substantially equal to that for said energy in free space, said means comprising a member having dielectric material different from that of air and partially filling said wave guide and at least co-extensive with the apertured portion of said wave guide.

2. A directive radiator comprising a rectangular conducting wave guide excited by linearly polarized electromagnetic energy and having a side parallel to the plane of said polarized energy longitudinally apertured over a length that is long compared to the wavelength of said electromagnetic energy for radiating said energy, and a solid medium of dielectric constant $\epsilon$ filling a small fraction $\delta$ of said guide perpendicular to said apertured side giving said guide an effective dielectric constant $\epsilon_{eff}$ expressed by the equation:

$$\epsilon_{eff.}=1+\frac{\delta(\epsilon-1)}{\epsilon-\delta(\epsilon-1)}$$

the principal lobe of radiation being at the same position as that for the same guide wholly filled with a uniform dielectric with dielectric constant $\epsilon_{eff}$.

3. High frequency antenna apparatus comprising a rectangular wave guide adapted to be excited by linearly polarized high frequency energy and having coupling means between the interior and exterior thereof in a side parallel to the plane of said polarized energy, said coupling means extending over a distance long in comparison to the wavelength of said energy, and a solid member of dielectric constant different from that of air within said guide and having a dimension perpendicular to said side which is a small fraction of the corresponding dimension of said guide.

4. Apparatus as in claim 3 wherein said member is spaced both from said side and the side of said guide opposite thereto.

5. Apparatus as in claim 3 wherein said member is disposed along the side of said guide opposite said first-mentioned side.

6. A high frequency end fire radiant energy interchanging device comprising a wave guide having a slot extending longitudinally thereof for a distance long in comparison to the operating wavelength of said device, the cross-sectional dimensions of said guide having a value producing a propagation constant for the high frequency energy traveling within said guide substantially equal to that for said energy in free space, whereby said device has a highly directive directivity pattern extending substantially along said guide.

7. A high frequency end-fire antenna comprising a hollow wave guide having coupling means for exchanging high frequency energy between the interior and exterior thereof and distributed over a distance long in comparison to the operating wavelength thereof, said guide having a propagation constant for high frequency energy within said guide approaching that for said energy in free space, whereby said device has a highly directive directivity characteristic extending substantially along said guide.

8. An antenna as in claim 7 wherein said guide is apertured over said long distance to provide said coupling means.

9. A high frequency end fire radiant energy transducer comprising a wave guide having a slot extending longitudinally of one wall thereof for a distance long in comparison to the operating wavelength, and means for producing a propagation constant for the high frequency energy traveling in said guide substantially equal to that of said energy in free space whereby a highly directive directivity pattern is produced, extending substantially in the direction of said guide.

10. A transducer as in claim 9 wherein said last-named means comprises a dielectric member partially filling said wave guide and at least co-extensive with said slot.

11. A transducer as in claim 9 wherein said wave guide is non-circular and said last-named means comprises a slab of dielectric material extending across the narrower dimension of said wave guide to partially fill said wave guide at least co-extensively with said slot.

12. A transducer as in claim 9 wherein said last-named means comprises a slab of dielectric material lining one of the walls of said wave guide and partially filling said wave guide at least co-extensively with said slot.

13. A high frequency radiant energy transducer comprising a wave guide having a rectangular cross-section and a slot extending longitudinally of one wall thereof for a distance long in comparison to the operating wavelength, a pair of conductive members extending along the edges of said slot and in planes perpendicular to said wall, and a pair of flanges connected respectively to said members and parallel to said wall, the depth of said slot as defined by said conductive members being one-half the depth of said wave guide perpendicular to said wall.

14. A high frequency radiant energy translating device comprising a wave guide having a slot extending longitudinally of one wall thereof for a distance long in comparison to the operating wavelength, a pair of conductive members extending along the edges of said slot, and a pair of flanges connected respectively to said members on either side of said slot for controlling the directivity of energy interchange between the interior of said wave guide and the space exterior thereof.

15. A high frequency radiant energy transducer comprising a rectangular wave guide having a slot extending longitudinally thereof in one wall thereof for a distance long in comparison to the operating wavelength, and a slab of dielectric material having a volume substantially less than that defined by the inner dimensions of said wave guide and forming a lining for one of the walls of said wave guides and at least co-extensive with said slot.

16. A transducer as in claim 15 wherein said dielectric lining is disposed along a wall parallel to the wall containing said slot.

17. A transducer as in claim 15 wherein said dielectric lining is disposed along a wall perpendicular to the wall containing said slot.

18. A high frequency radiant energy translating device comprising a rectangular wave guide having a slot extending longitudinally of one wall thereof for a distance long in comparison to the operating wavelength, a pair of conducting members extending along the edges of said slot and in planes perpendicular to said wall, a pair of conducting flanges connected to said members and extending in a plane parallel to said wall, and a slab of dielectric material at least co-extensive with said slot and positioned between said conducting members.

19. A transducer as in claim 18, further comprising a second slab of dielectric material forming a lining for one wall of said wave guide and partially filling said wave guide.

20. High frequency radiant energy antenna apparatus comprising a rectangular wave guide having a slot extending longitudinally thereof in one wall thereof for a distance long in comparison to the operating wavelength, and a slab of dielectric material having a cross-sectional area materially less than the cross-sectional area of the interior of said wave guide and disposed interiorly of said wave guide in a plane parallel to the wall containing said slot.

21. High frequency apparatus comprising a hollow rectangular wave guide having dissimilar wall dimensions adapted to be excited by linearly polarized electromagnetic energy, said guide having said dimensions uniform throughout so as to transmit a specific type of wave unconverted therethrough and a slab of dielectric material having uniform thickness less than the thickness dimension of said wave guide disposed within said wave guide with its minimum dimension perpendicular to the plane of polarization of said polarized energy.

22. Apparatus as in claim 21, wherein said slab of dielectric material is disposed adjoining one wall of said wave guide.

23. Apparatus as in claim 21, wherein said slab of dielectric material is disposed in spaced relation to two opposite walls of said wave guide.

24. High frequency apparatus comprising a hollow conducting rectangular wave guide having dissimilar wall dimensions adapted to be excited by high frequency electromagnetic energy, and a slab of dielectric material having thickness smaller than one cross-sectional dimension of said wave guide and disposed within said wave guide with said thickness dimension parallel to one wall of said guide.

25. A high frequency radiant energy transducer comprising a wave guide having dissimilar transverse wall dimensions, a slot extending longitudinally in a narrower dimensioned wall thereof for a distance long in comparison to the operating wavelength, and a slab of dielectric material having a volume substantially less than that defined by the inner dimensions of said wave guide forming a lining for one of the walls of said wave guide and at least coextensive with said slot.

26. A high frequency radiant energy transducer comprising a rectangular wave guide having a slot extending longitudinally in a wall thereof for a distance long in comparison to the operating wavelength in the direction of energy flow, and a slab of dielectric material having a volume substantially less than that defined by the inner dimensions of said wave guide and forming a lining for one of the walls of said wave guide and at least coextensive with said slot.

27. A high frequency radiant energy transducer comprising a rectangular wave guide having walls of dissimilar transverse dimensions, a slot extending longitudinally in a narrow dimensioned wall thereof for a distance long in comparison to the operating wavelength in the direction of energy flow, and a slab of dielectric material having a volume substantially less than that defined by the inner dimensions of said wave guide forming a lining for one of the walls of said wave guide and at least coextensive with said slot.

28. A high frequency antenna comprising a hollow wave guide having coupling means for exchanging high frequency energy between the interior and exterior thereof and longitudinally distributed over a distance long in comparison to the operating wavelength thereof, said coupling means comprising two sections, one of said sections being perpendicular to said wave guide and the other section extending at an angle from said perpendicular section whereby energy may be angularly directed into free space from said device in a highly directive directivity characteristic.

29. A high frequency end-fire antenna comprising a hollow wave guide having coupling means for exchanging high frequency energy between the interior and exterior thereof and longitudinally distributed over a distance long in comparison to the operating wavelength thereof, said coupling means including conductive members connected to said guide at an angle thereto, and said guide having a propagation constant for high frequency energy within said guide approaching that for said energy in free space, whereby said energy may be angularly directed into free space from said device in a highly directive directivity characteristic extending substantially along said guide.

30. A high frequency end-fire antenna comprising a hollow wave guide having coupling means in one wall thereof for exchanging high frequency energy between the interior and exterior thereof and longitudinally distributed over a distance long in comparison to the operating wavelength thereof, said coupling means having a portion at right angles to said guide wall and having a further portion connected at an angle to said first portion, and said guide having a propagation constant for high frequency energy within said guide approaching that for said energy in free space, whereby said energy may be angularly directed into free space from said device in a highly directive directivity characteristic extending substantially along said guide supported substantially flush with a ground surface.

31. A high frequency end-fire antenna comprising a hollow wave guide with a wide wall and a narrow wall and having coupling means in the narrow wall thereof for exchanging high frequency energy between the interior and exterior thereof and longitudinally distributed over a distance long in comparison to the operating wavelength thereof, said guide having a propagation constant for high frequency energy within said guide approaching that for said energy in free space, whereby said device has a highly directive directivity characteristic extending substantially along said guide.

32. High frequency radiant energy antenna apparatus comprising a hollow rectangular wave guide having a slot extending longitudinally along a side thereof for a distance long in comparison to the operating wavelength, a pair of walls adjacent said slot and defining a wave passage and dielectric means disposed along both said passage and said wave guide for producing effectively the same dielectric constant for said guide and said passage.

33. A high frequency antenna cimprising a hollow wave guide having coupling means for exchanging high frequency energy between the interior and exterior thereof, said means being longitudinally distributed over a distance long in comparison to the operating wavelength thereof and comprising two sections, one of said sections containing a slab of dielectric attached thereto to produce effectively the same dielectric constant for said guide and said coupling means.

34. A high frequency antenna comprising a hollow wave guide having coupling means for exchanging high frequency energy between the interior and exterior thereof, said means being longitudinally distributed over a distance long in comparison to the operating wavelength thereof, and having two sections, one of said sections being perpendicular to said wave guide and the other section extending at an angle from said perpendicular section, said perpendicular section containing a slab of dielectric disposed therewithin.

35. High frequency radiant energy antenna apparatus comprising a hollow rectangular wave guide having a slot in a wall thereof extending longitudinally therealong for a distance long in comparison to the operating wavelength, conductive means mounted on said wave guide contiguous to said slot and defining a passageway communicating with said guide through said slot, and means in said passageway for producing effectively the same dielectric constant in said passageway as in said wave guide.

36. High frequency radiant energy antenna apparatus comprising a hollow rectangular wave guide having a slot extending longitudinally along a side of said wave guide for a distance long in comparison to the operating wavelength, a wall mounted on said wave guide contiguous to said slot, and dielectric means disposed along said wall.

MONTGOMERY H. JOHNSON.
WILLIAM H. RATLIFF, JR.
WILLIAM W. HANSEN.

REFERENCES CITED

The following references are of record in the file of this patent:

UNITED STATES PATENTS

| Number | Name | Date |
|---|---|---|
| 1,926,807 | Hansell | Sept. 12, 1933 |
| 2,207,845 | Wolff | July 16, 1940 |
| 2,206,683 | Wolff | July 2, 1940 |
| 2,206,923 | Southworth | July 9, 1940 |
| 2,241,119 | Dallenbach | May 6, 1941 |
| 2,253,501 | Barrow | Aug. 26, 1941 |
| 2,273,447 | Ohl | Feb. 17, 1942 |
| 2,234,293 | Usselman | Mar. 11, 1941 |
| 2,238,770 | Blumlein | Apr. 15, 1941 |
| 2,129,669 | Bowen | Sept. 13, 1938 |

Certificate of Correction

Patent No. 2,433,368.  December 30, 1947.

MONTGOMERY H. JOHNSON ET AL.

It is hereby certified that errors appear in the printed specification of the above numbered patent requiring correction as follows: Column 5, Equation 5, for "$E_y = \left(\sin \frac{\pi x}{2a}\right) e_{ikz}$" read $E_y = \left(\sin \frac{\pi x}{2a}\right) e^{ikz}$;

column 15, after line 55, insert the following paragraph:

"A divisional application Serial No. 495,101 in the name of William H. Ratliff, Jr., was filed July 17, 1943, covering the material of Figs. 46–49 and 55 of this application. A continuing application Serial No. 592,092 in the names of Montgomery H. Johnson and William W. Hansen was filed May 15, 1945, covering the material of Figs. 18–31 of this application."

column 19, line 56, for "cimprising" read *comprising*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*